United States Patent [19]

Pocholle et al.

[11] Patent Number: 5,088,096
[45] Date of Patent: Feb. 11, 1992

[54] TUNABLE POWER LASER

[75] Inventors: Jean-Paul Pocholle, Arpajon/La Norville; Michel Papuchon, Massy; Claude Puech, Ballainvilliers, all of France

[73] Assignee: Thomson-CSF, Puteaux, France

[21] Appl. No.: 547,146

[22] Filed: Jul. 3, 1990

[30] Foreign Application Priority Data

Jul. 11, 1989 [FR] France ............... 89 09303

[51] Int. Cl.$^5$ ............................................. H01S 3/10
[52] U.S. Cl. ........................................ 372/20; 372/3; 372/21; 372/55; 372/23; 372/97
[58] Field of Search .................... 372/3, 20, 75, 21, 23, 372/97, 55, 98, 105, 106

[56] References Cited

U.S. PATENT DOCUMENTS

| | | | |
|---|---|---|---|
| 3,983,507 | 9/1976 | Tang et al. | 372/20 |
| 4,327,337 | 4/1982 | Liu | 372/3 |
| 4,866,720 | 9/1989 | Holly | 372/75 |

FOREIGN PATENT DOCUMENTS 2438358  4/1980  France .

OTHER PUBLICATIONS

Soviet Journal of Quantum Electronics, vol. 18, No. 8, Aug. 1988, pp. 1035–1037, New York, U.S., R. R. Buzyalis, et al., "Parametric Generation of Tunable Picosecond Light Pulses as a Result of Pumping with Radiation from a Stimulated Raman . . . ".

IEEE Journal of Quantum Electronics, vol. QE-18, Aug. 1982, No. 8, pp. 1246–1252, New York, U.S., D. G. Bruns, et al., "Scalable Visible ND:YAG Pumped Raman Laser Source".

Laser und Optoelektronik, vol. 18, No. 4, pp. 311–318, Dec. 1986, Stuttgart, DE, A. Seilmeier, "Tunable Picosecond Light Pulses Generated by Parametric Three-Photon Interaction".

Applied Physics Letters, vol. 49, No. 11, Sep. 15, 1986, pp. 608–610, New York, U.S., R. C. Eckardt, et al., "Broadly Tunable Infrared Parametric Oscillator Using AgGaSe$_2$".

Primary Examiner—James W. Davie
Attorney, Agent, or Firm—Oblon, Spivak, McClelland, Maier & Neustadt

[57] ABSTRACT

A tunable laser source comprising a laser source emitting a pump beam towards a Raman cell. It transmits a beam at a Stokes wavelength to a non-linear crystal. Depending on the angle of this beam with the optical axis of the crystal, the non-linear crystal transmits two output waves at wavelengths that are different from the Stokes wavelength.

9 Claims, 3 Drawing Sheets

FIG_1
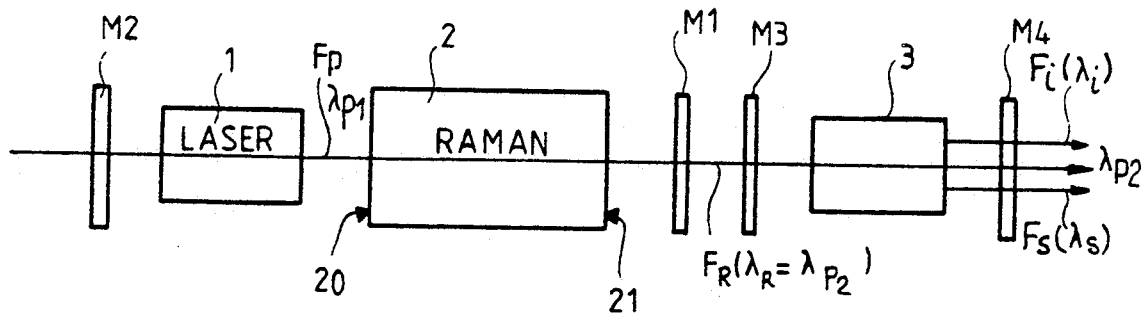

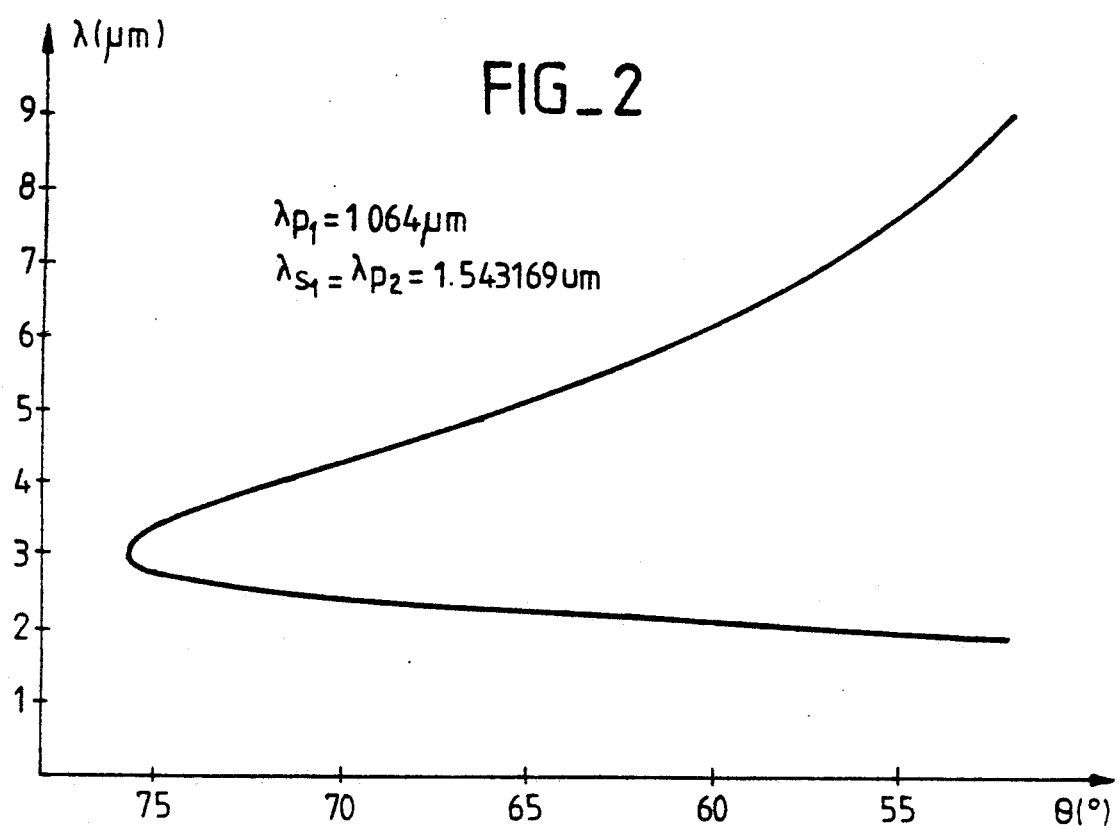
FIG_2
$\lambda_{p_1} = 1.064 \mu m$
$\lambda_{s_1} = \lambda_{p_2} = 1.543169 \mu m$
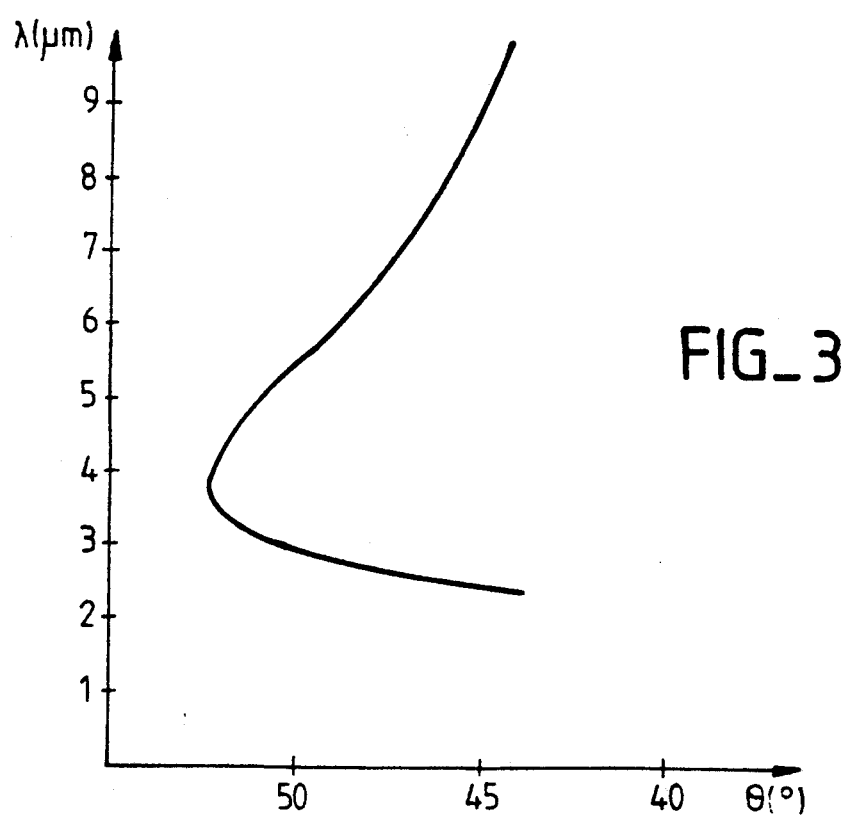
FIG_3

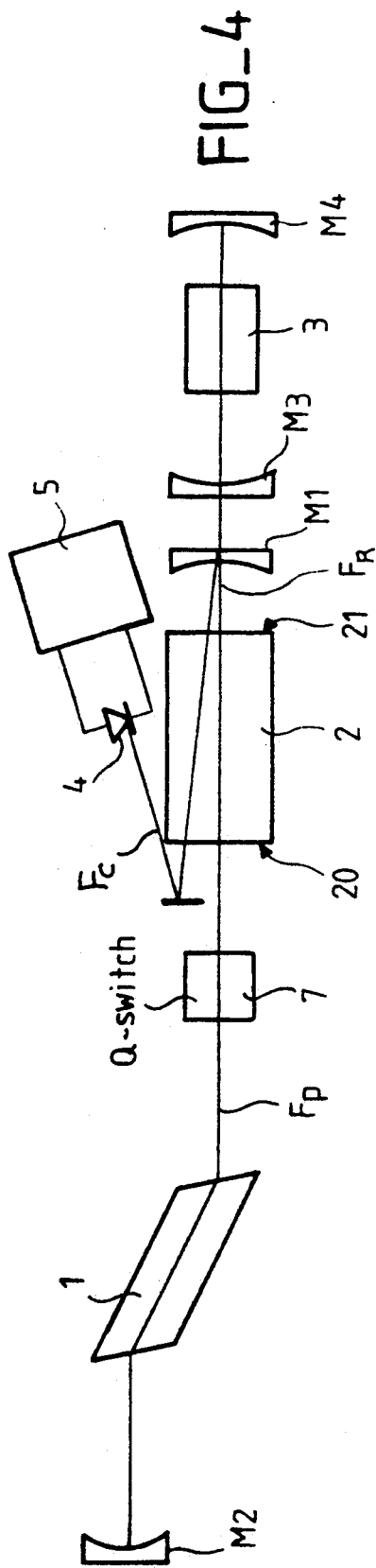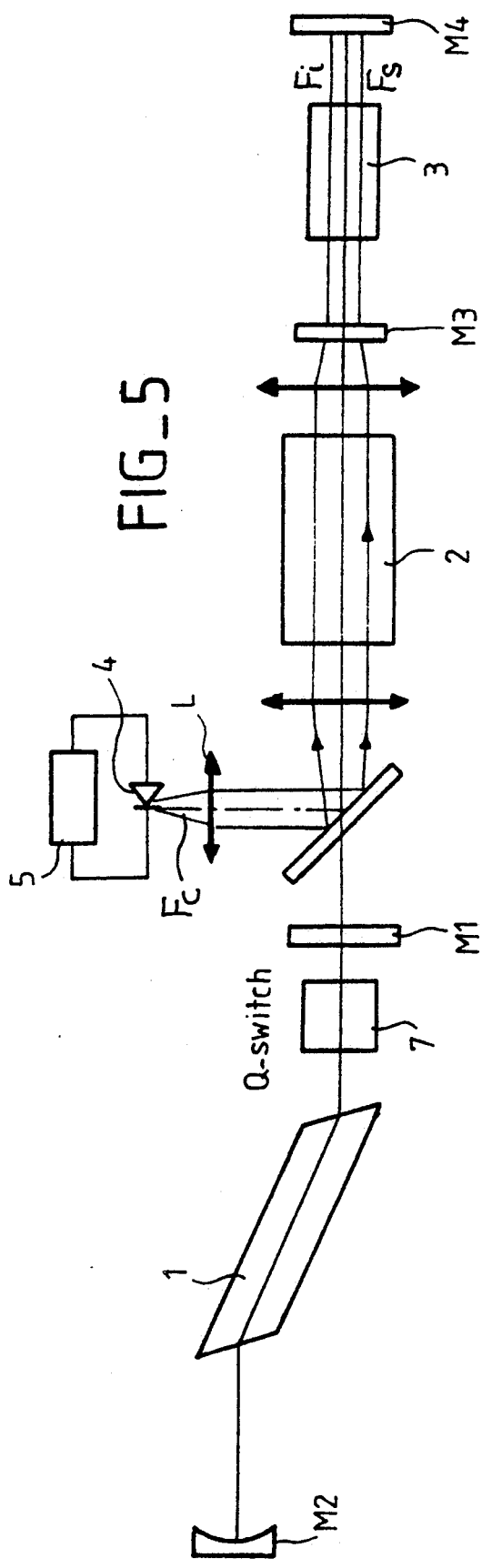

TUNABLE POWER LASER

BACKGROUND OF THE INVENTION

1. Field of the Invention

The invention concerns a tunable power laser and, notably, a power laser source emitting at a wavelength that represents no danger to the human eye.

The field covered by the present invention concerns the making of power laser sources working in a band ranging from 1.54 μm to 10 μm.

The choice of the emission wavelength in a spectral region located in a band higher than 1.5 μm is related to the fact that the risk of optical damage to the eye is reduced to the minimum and that, at this wavelength, the atmosphere offers a good window of transmission. It may be recalled that the maximum exposure for the human eye is 5 μJ/cm² at 1.064 μm, and goes to 1 J/cm² at 1.54 μm. It follows from this that the making of power laser sources in this spectral region has undeniable advantages.

2. Description of the Prior Art

However, there are no materials displaying a matrix effect nor any rare earths that permit usable laser transmissions, apart from the ion Erbium.

The drawback related to the use of this rare earth is that the laser operation is described by a system with three levels, and this entails a number of disadvantages (high threshold, superimposition of the laser transition on an absorption band, easier saturation of the gain etc.).

In another method, this kind of source is made by Raman transfer. In this case, an Nd:YAG (neodymium-doped YAG) laser is used. This Nd:YAG laser pumps a cell in which there is a gas with a Raman frequency shift permitting the pump wave, which is at 1.064 μm, to be transferred towards 1.54 μm. Such a gas may be methane (CH₄) under high pressure.

This gas has a Raman spectral shift of 2916 cm⁻¹ and a Raman gain coefficient d of the order of 1.4 cm/GW under a pressure of 10 atmospheres. A description of such sources, using the Raman effect, will be found in the following articles: D.C. HANNA. "A High Power Short Pulse Stimulated Raman Source at 1.54 μm" in Optics Communication vol. 60, No. 3, Nov. 1, 1990; D.C. HANNA et al, "Stimulated Raman Scattering of Picosecond Light Pulse in Hydrogen, Deuterium and Methane" in IEEE Journal of Quantum Electronics, vol. QE-22, No. 2, February 1986; J.J. OTTUSCH et al, "Measurement of Raman Gain Coefficients of Hydrogen, Deuterium and Methane" in IEEE Journal of Quantum Electronics, vol. 24, No. 10, October, 1988. Thus, with a pumping centered on the wavelength of emission of the Nd:YAG laszer, it is possible to generate an emission at the Stokes wavelength:

$$\lambda_R = \frac{2\pi\epsilon}{\omega R}$$

obtained from the relationship:

$$W_R = W_p - \Delta W_R$$

$W_p$, $\Delta W_R$, $W_R$ being respectively the pump angular frequency and the frequency of the Stokes wave. In terms of wavelength and for a given Raman shift in cm⁻¹, we obtain:

$$\lambda_R = (1/\mu_p (cm) - 2916 \text{ cm}^{-1})^{-1}$$

However, a source such as this cannot be used to tune the wavelength emitted to a determined wavelength. The invention therefore puts a source such as this into application and provides means enabling a source such as this to be made tunable.

SUMMARY OF THE INVENTION

The invention therefore concerns a power laser source comprising:
- a pump laser source emitting an optic pump wave ($F_p$) at a first determined wavelength;
- a pressurized gas cell containing a gas of a nature such that, receiving the pump wave ($F_p$), the cell emits a Stokes wave ($F_R$) at a second wavelength which is different from the first wavelength;
- a non-linear crystal receiving the Stokes wave ($F_R$) at a determined angle with respect to the optical axis of the crystal and giving, in exchange, two output waves ($F_s$, $F_i$) with wavelengths that are different from the second wavelength.

BRIEF DESCRIPTION OF THE DRAWINGS

The different features and characteristics of the invention will appear more clearly from the following description, made with reference to the appended drawings, of which:

FIG. 1 shows a first exemplary embodiment of the device according to the invention;

FIGS. 2 and 3 are graphs of the wavelengths obtained as a function of the inclination of the input beam with reference to the optic axis of the crystal;

FIGS. 4 and 5 show exemplary embodiments of variants of the device according to the invention.

DETAILED DESCRIPTION OF THE INVENTION

Referring to FIG. 1, we shall begin by describing a first exemplary embodiment of the power laser device according to the invention.

The device of FIG. 1 comprises chiefly:
- a laser rod 1 with external cavity, emitting a pump beam $F_p$ at a determined wavelength $\lambda_p$;
- a pressurized gas cell 2 receiving the pump beam $F_p$, wherein the gas is excited by this beam in such a way that it emits a beam $F_R$, by Raman effect, with a frequency shift, and there is a transfer of energy from the pump beam $F_p$ towards the beam $F_R$;
- two mirrors M1 and M2, located on either side of the laser 1 and the cell 2, forming an optic cavity;
- a crystal 3 included in an optic cavity formed by two mirrors M3 and M4, receiving the Raman wave $F_R$ and emitting two waves $F_i$ and $F_s$ at wavelengths $\lambda_i$ and $\lambda_s$.

The laser 1 is a power laser emitting at a wavelength $\lambda_p$ that is dangerous to the human eye. This type of laser is commonly used in current technology because of the high power that it is capable of emitting. For example, it is a neodymium-doped YAG (Nd:YAG) laser emitting at a wavelength $\lambda_p = 1.064$ micrometers.

The pressurized gas cell 2 contains a gas such as methane (CH₄) which makes it possible, from a pump beam $F_p$ with a wavelength $\lambda_p = 1.064$ micrometers, to obtain a beam $F_R$ with a wavelength $\lambda_R = 1.54$ micrometers.

The pump beam $F_p$ penetrates the gas cell 2 through a transparent face 20 of the gas cell 2. It goes through the cell 2 along a main axis of the cell and comes out through a transparent face 21 opposite the face 20. The beam $F_R$ emerging from the cell 2 reaches the mirror M1 where it is reflected and returns in the reverse direction towards the mirror M2. Thus, the cavity made in the mirrors M1 and M2 makes it possible to take advantage of the high density of intra-cavity power and, through the multiple-passage in the cavity, to obtain efficiency of conversion of the pump wave to the Stokes wave. However, the laser 1 could also be an intrinsic cavity laser.

In the pressurized gas cell, the process of development of the Raman wave may be represented by the relationship:

$$P_R = P_R^0 \exp(-a_R \cdot L + g_R \cdot P_D^0 / A_{eff} \cdot L_{eff}) \quad (1)$$

which is valid in low conversion mode and correponds to the case where the non-linear process is set up. The different parameters represent:

$a_R$ : coefficient of absorption at $W_R$;
L : distance of propagation in the gas cell 2;
$P_pO$ : incident pump power in the cell;
$A_{eff}$: effective length of the non-linear interaction taking account of the losses at the pump wavelength;
$P_R$ : The power of the Stokes wave (Raman wave) as a function of the distance of propagation in the Raman cell.

In this case, $P_RO$ represents the incident power initiating the non-linear process.

When there is no control beam injected into the Stokes wavelength, the transfer mechanism is generated through the noise in the cavity and by amplification of the Stokes photons in the cavity.

The crystal 3 has an optical axis and receives the Raman beam $F_R$ in a direction that forms an angle with this optical axis. A second order non-linear process is then obtained in the crystal. The Raman wave $F_R$ is used as a pump wave in a parametrical oscillator type of assembly.

For example, the phase tuning range may be extended from a scheme such as this by using a silver gallium selenide crystal ($AgGaSe_2$) and a pump wave resulting from the Raman effect. In particular, the use of an Nd:YAG laser pumping a $CH_4$-based Raman cell allows for obtaining a source that is tunable between 1.8 and 10 μm. The Raman shift of the emission wave occurs from 1.06415 μm to 1.543169 μm. This spectral component of stimulated Raman emission is obtained by focusing the pump laser wave in the Raman cell comprising two reflectors that allow for working with multiple reflections.

The Raman wave thus created is then focused in an optic cavity containing the non-linear crystal. As a function of the incident angle of the (Raman) pump beam, with the optical axis of the crystal, it is possible to obtain two waves $F_s$ and $F_i$ (signal wave and idler wave) that meet the phase tuning conditions:

$$K_r - K_s - K_i = 0$$

$K_j$ represents the vectors of waves proper to each of the fields present in the non-linear medium.

FIGS. 2 and 3 show spectral regions covered by different types of composite sources.

FIG. 2 shows a FIG. 2 shows a graph of emission of a Neodymium-doped Yttrium garnet based (Nd:YAG) laser source followed by a Raman cell containing methane under pressure and then an $AgGaSe_2$ based crystal with parametric effect. In this graph, it is seen that, as a function of the orientation of the beam $F_R$ with respect to the optical axis of the crystal 3, the wavelengths $\lambda_i$ and $\lambda_s$ of the beams $F_i$ and $F_s$ may be be set as follows: one of them in a range between 1.5 μm and 3 μm approximately and the other between 3 μm and 10 μm approximately. The ranges of wavelengths are obtained for an inclination angle $\theta$ of 50° to 75° between the beam $F_R$ and the optical axis of the crystal.

FIG. 3 shows a graph of emission of a Neodymium doped Yttrium garnet based (Nd:YAG) laser source followed by a Raman cell containing hydrogen under pressure and then an $AgGaSe_2$ crystal with parametric effect.

According to this graph, the ranges of wavelengths obtained for the beams $F_i$ and $F_s$ are substantially identical to those of the graph of FIG. 2. However, this is obtained, in the graph of FIG. 3, for an angle $\theta$ of between 45° and 52° approximately.

Referring to FIG. 4, we shall now describe a variant of the power laser of the invention.

This variant is designed so that the power of the emitted beams $F_i$ and $F_s$ is increased.

To this end, there is provision for a control light source such as a control laser diode 4, controlled by a circuit 5 and emitting a control beam $F_c$ towards the gas cell 2, at a wavelength that is substantially equal to that of the beam $F_R$. The control beam $F_c$ and the pump beam $F_p$ penetrates the gas cell 2 in a substantially colinear way.

The control beam $F_c$ allows for controlling the process of energy transfer from the pump beam $F_p$ towards the Raman wave $F_R$ owing to substantially equal values of the wavelengths of the control beams $F_c$ and of the Raman wave $F_R$.

The system of FIG. 4 can thus be used to obtain waves $F_i$ and $F_s$, at the output of the crystal 3, that are tunable in wavelengths and have high power.

FIG. 5 shows a second variant of the invention wherein the optic cavity demarcated by the mirrors M1 and M2 contains the laser 1 but does not contain the gas cell 2 which is in the path of the pump beam $F_p$ but outside the optic cavity. The Raman amplification in the gas cell 2 is therefore achieved outside the laser cavity.

Through this arrangement, the control beam $F_c$ can be made so as to be strictly colinear with the pump beam $F_p$ without any risk of an optical return to the laser diode 4, which could be the case in the device of FIG. 4 if the control beam $F_c$ and pump beam $F_p$ were to be strictly colinear.

As shown in FIG. 5, the control beam $F_c$ and the pump beam $F_p$ can be superimposed by means of a separating strip placed in the paths of the pump beam $F_p$ and control beam $F_c$ and suitable oriented with respect to these beams.

The configuration of the system of FIG. 5 therefore consists of a pump laser and a Raman laser enabling the generation of a frequency shifted optic wave. This Raman wave, controlled by means of an ancillary laser, enables the Raman process to be initiated. Although it is not shown in the figure, the control laser may be a solid laser pumped by means of diode lasers. A source such as this has the advantage of being capable of modulation at a relatively high rate while, at the same time, preserving a configuration with a (spatially and temporally) stable mode. The pump laser is a power laser ($Nd^{3+}$ doped YAG or holmium-doped YLF for example). The beam of this laser pumps a gas cell in which there is a gas under pressure that enables the frequency shift operation to be performed through the Raman type inelastic scattering process. The extent of the Raman shift will depend on the gas used. In our example, the use of an Nd:YAG laser working in triggered mode at 1.06415 μm enables the generation of the following wavelengths as a function of the nature of the gas:

$H_2 : \lambda_R = 1.907606$ μm $D_2 : \lambda_R = 1.560021$ μm $CH_4 : \lambda_R = 1.543169$ μm Such operations are well known, especially for methane. By contrast, it is possible to increase the use of such sources in other spectral regions by using other sources for the pumping, made from a variety of matrix effects and rare earths.

Some examples are mentioned here below. A pump laser is used, the rare earth ion and the matrix effect of which can be used to obtain a laser transition at the wavelength $\lambda_p$. This power laser is coupled to a Raman cell filled with a gas generating a frequency translation of the pump wave by means of the Raman effect. Thus the wavelength $\lambda_R$ is obtained. The Raman process can be triggered by the injection of a control beam. To this end, the Raman wavelength should coincide with the control wavelength.

Then, the non-linear crystal 3 may be, for example, AgGaSe$_2$, for which the properties of variation in the ordinary and extraordinary indices do not permit phase tuning at 1.064 μm. By contrast, the availability of pump sources in the band approaching 1.5 μm enables this type of crystal to be used for making a tunable source that ranges from 1.5 μm to 10 μm, since the phase tuning conditions can be obtained from 1.5 μm onwards.

The use of an Nd:YAG laser as a pump wave, a Raman cell (CH$_4$) and an AgGaSe$_2$ based parametric oscillator represents a solution adapted to the making of a tunable source with a very wide band.

This kind of source extends the range of use of the Nd:YAG laser and its versatility. This kind of material can be used to obtain the following from one and the same optic source of power:

a laser working at 1.064 μm;

an emitter working at 1.543 μm in associating a Raman cell;

a tunable source covering the 1.8–10 μm region in pumping a parametric oscillator based on a chalcopyrite type crystal (AgGaSe$_2$).

According to the invention, therefore, it has been possible, through the coupling of an optic wave emitted according to a Raman process with a medium 3, the second order non-linear susceptibility of which is not zero, to obtain an output wave with a wavelength that is adjustable and different from that of the wave given by the Raman process. In this case, it is possible, inter alia to induce a non-linear polarization in this medium 3, wherein frequency mixing operations may develop. In particular, from one pump wave $\lambda_p$, we obtain two waves at wavelengths $\lambda_s$ and $\lambda_i$ meeting the phase tuning conditions:

$$K_p - K_s - K_i = 0$$

$K_j$ representing the wave vector $\lambda_j$ with $K_j = 2\pi n_j$ with $K_j = 2\pi n_j \lambda/\lambda_j$ In this case, it is possible to adjust the spectral region in which the non-linear effects can develop by modifying or selecting the pump wavelength.

For a crystal having a wide transmission window, a high non-linear coefficient and extensive possibilities of phase tuning, the spectral region covered by the non-linear process will be all the greater as the wavelength will be located in the region of the short wavelengths.

It is clear that the above description has been given purely as a non-restrictive example and that other variants can be contemplated without going beyond the scope of the invention. The numerical examples and the nature of the materials indicated have been given only to illustrate the description.

What is claimed is:

1. A power laser source comprising:
   a first laser cavity defined by a first set of two optically aligned reflection means, said cavity including a pump laser source emitting an optic pump wave at a first predetermined wavelength;
   a pressurized gas cell containing a gas of a nature such that, receiving the pump wave, the cell emits a Stokes wave at a second wavelength which is different from the first wavelength;
   a second cavity defined by a second set of two optically aligned reflection means, said second cavity including a non-linear crystal receiving the Stokes wave at a determined angle with respect to the optical axis of the crystal and providing two output waves with wavelengths which are different from the second wavelength wherein the wavelengths of said two output waves depend upon the value of said determined angle.

2. A power laser source according to claim 1, also comprising a control laser source emitting a control wave with a wavelength that is substantially equal to the second wavelength and transmitted to the pressurized gas cell substantially colinearly with the pump wave.

3. A power laser source according to claim 1, wherein the pump laser source is a first laser pumped by a first laser diode.

4. A power laser source according to claim 2, wherein the control laser source is a second laser pumped by a second laser diode.

5. A power laser source according to claim 1, wherein the determined angle, at which the non-linear crystal receives the Stokes wave, with respect to the optical axis is adjustable, thus enabling the wavelengths of the output waves to be adjusted.

6. A power laser source according to claim 3, wherein the first laser is a neodymium doped yttrium garnet (Nd:YAG) laser.

7. A power laser source according to claim 1, wherein the pump laser source and the gas cell are included in an optic cavity demarcated by a first mirror and a second mirror.

8. A power laser source according to claim 1, wherein the non-linear crystal is included in an optic cavity demarcated by a third mirror and a fourth mirror.

9. A power laser source according to claim 1, wherein:
   the pump laser source is an Nd:YAG type laser;
   the gas cell contains methane (CH$_4$) under pressure;
   the non-linear crystal is of the chalcopyrite (AgGaSe$_2$) type.

* * * * *